April 13, 1954     J. O'SHEA     2,675,251
VALVE AND VALVE OPERATING DEVICE
Filed May 11, 1950     3 Sheets-Sheet 3
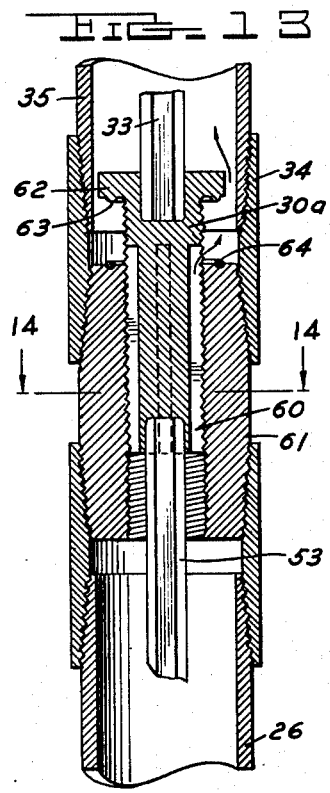
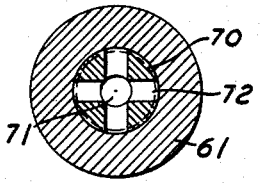
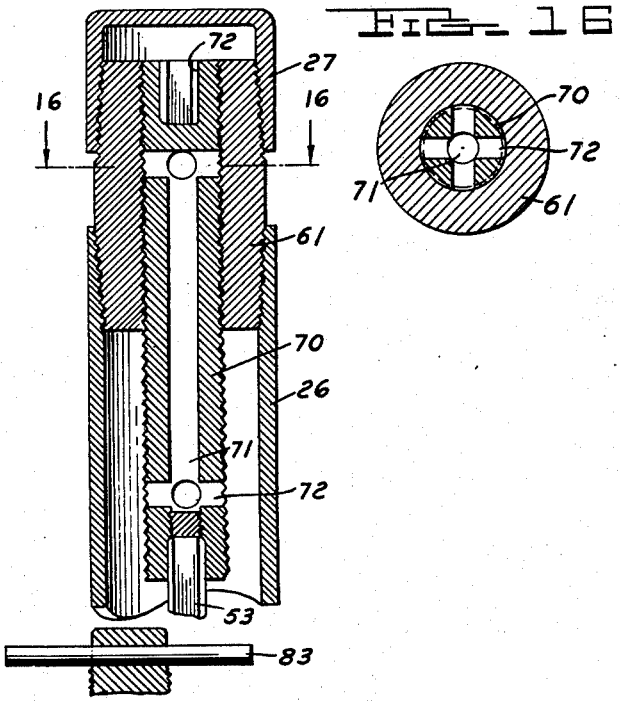
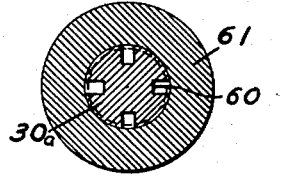
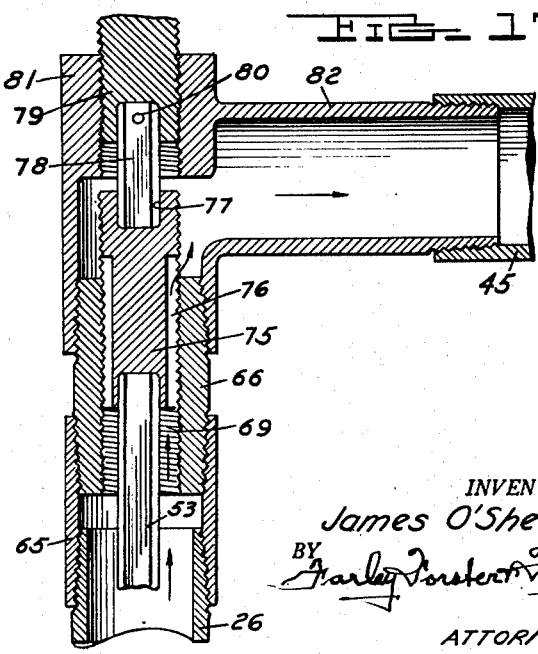
INVENTOR.
James O'Shea
BY
ATTORNEYS

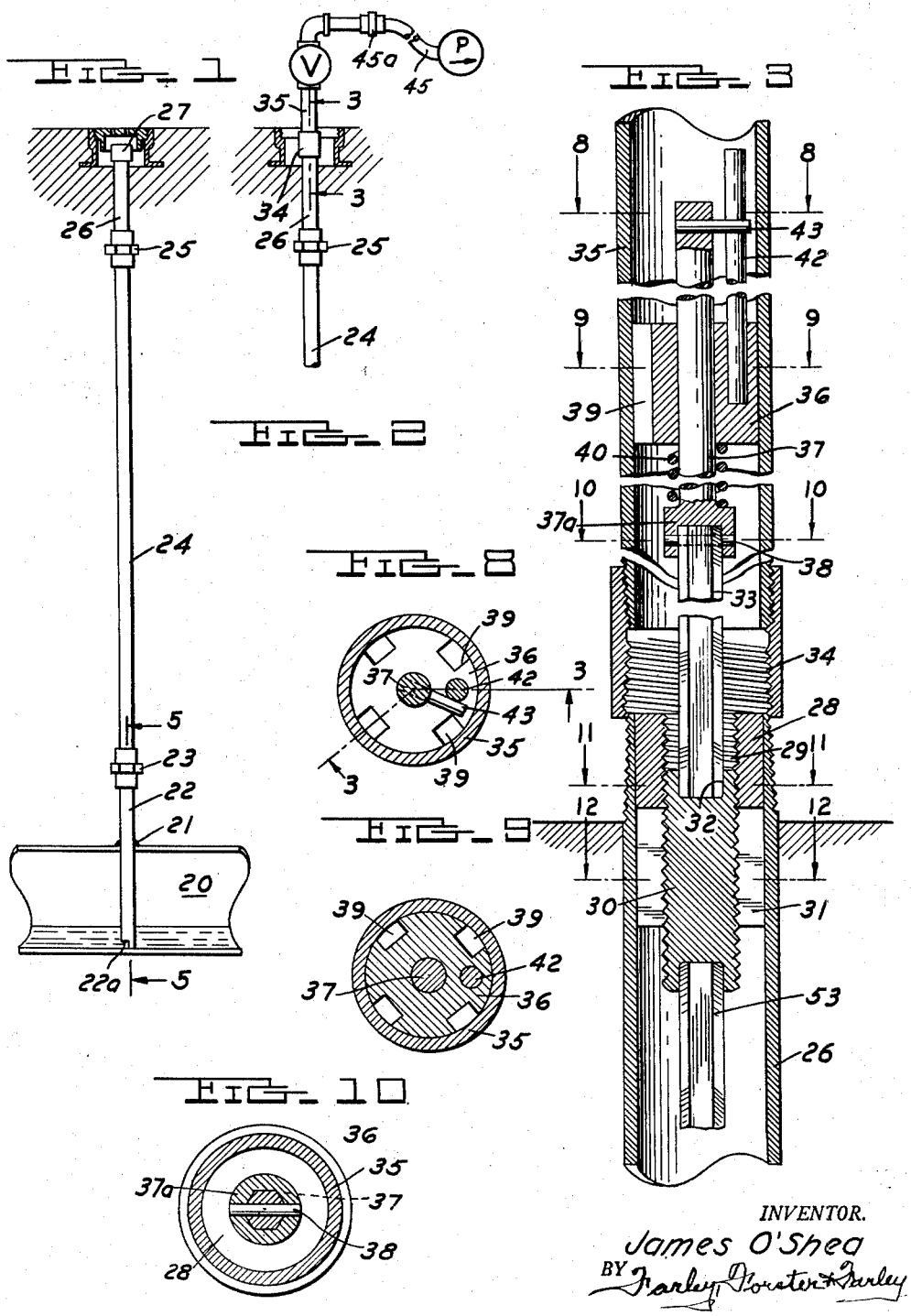

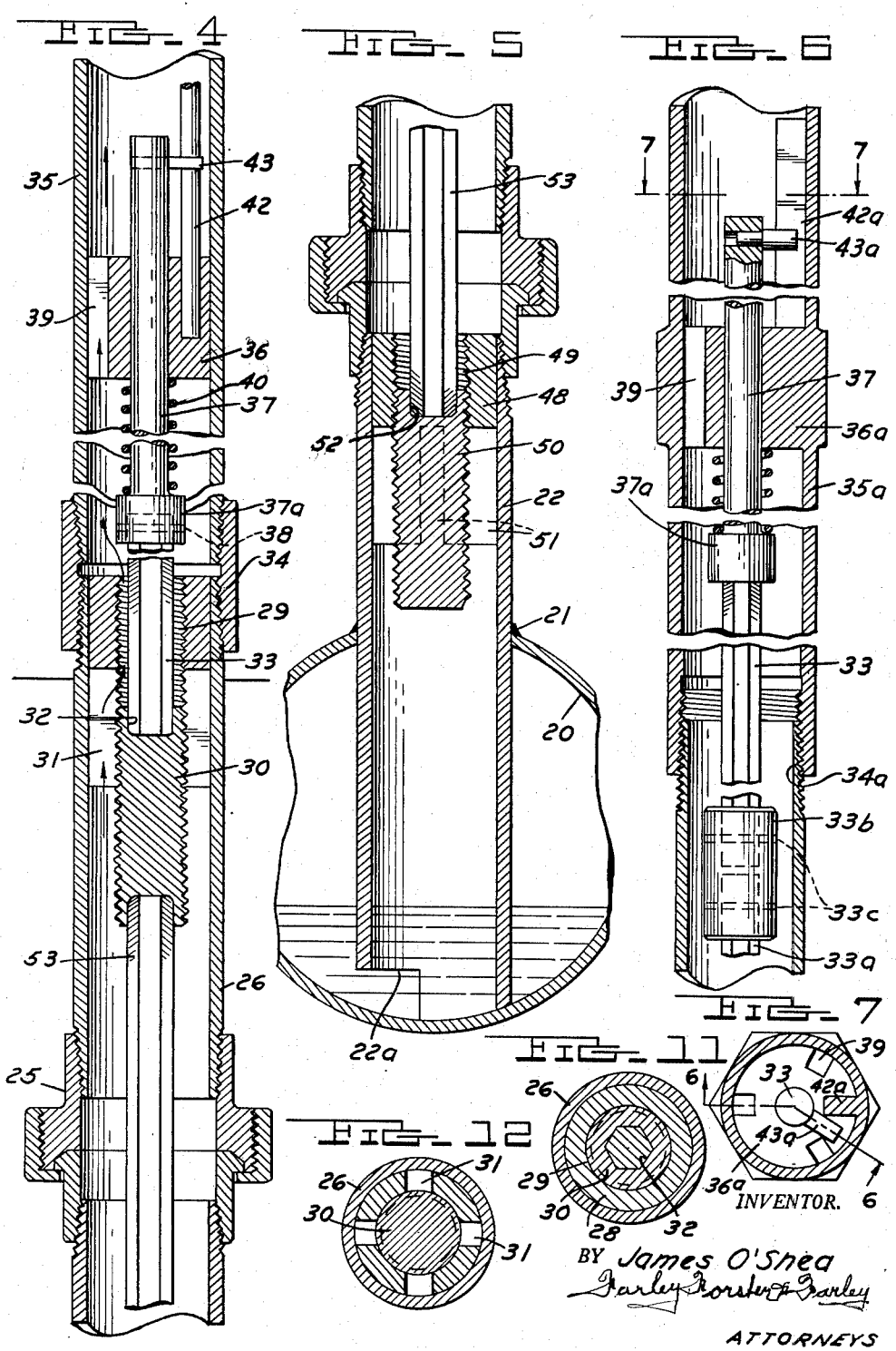

UNITED STATES PATENT OFFICE 2,675,251

VALVE AND VALVE OPERATING DEVICE

James O'Shea, Detroit, Mich.

Application May 11, 1950, Serial No. 161,410

2 Claims. (Cl. 284—18)

This invention relates to devices proposed to be used in connection with the removal of liquids and gases or mixtures of liquids and gases from one container to another. One purpose is to provide a simple and safe means for the removal or eduction of liquid condensates from gas mains or appurtenances thereto without an appreciable loss or escape of the liquid or gas to the atmosphere.

Another purpose is the providing of an improved method for the transfer of liquid, gas, or mixture thereof from one container or receptacle to another without the escape or release of any substantial portion of these substances, thereby eliminating or reducing to a minimum of the possibility of accidental igniting of explosive gases during the transfer thereof.

The invention also includes a simple and inexpensive valve which is caused to be operated by the attaching or detaching of the device employed for the transfer of the liquid or gaseous substances from one container to another.

The valve device included in the invention will of itself or in conjunction with a screwed plug or cap, seal completely the aperture of the container of the liquid or gas, or combination of both, against these substances escaping to the outside atmosphere when said valve is in a closed position.

The accompanying drawings and specifications show an application of the invention for the eduction of liquids from a gas main. It will be understood, however, that it also may be applied to the transfer of liquids, gases or a combination of both from any type of one container to another with the necessary constructional modifications as may be required to suit the application.

When the temperature of gas in a gas main saturated with vapors condensible at a given pressure reaches the dew point, condensation results. In low pressure gas systems there is also sometimes water leakage from the adjacent ground through faulty joints in gas service pipe, gas mains or deteriorated gas conduits. It is necessary, therefore, to provide drips at all low points in the mains to collect this condensate and water leakage. Otherwise these liquids would interfere seriously with the flow of gas by accumulating at these low points and eventually trap the main and shut off the flow of gas completely. The location of these drips is determined almost entirely by the condition which makes them necessary. At every point where, in making the grade of the main conform to the general contour of the surface of the ground, it is necessary to change from a descending grade to an ascending one, a drip must be provided to collect the condensate and prevent it from trapping the main at this low point. On level ground it may be necessary to establish low points in order to avoid excavating to excessive depths which would otherwise be necessary to give sufficient fall to the main. At such low points drips are installed.

These drips may be one of the following types:

(a) A line drip consisting of a section of pipe or pot placed beneath the gas main and connected thereto;

(b) A drip pot between sections of the main;

(c) A siphon drip at low point of main.

All these types of drips have risers assembled in one or more sections leading to the ground surface and having means for a pump or other facilities to be attached thereto for the purpose of removing the liquids that may have collected therein.

In low-pressure gas distribution systems these risers have closure means at or near ground surface which may be removed and a hose connection from a pump or vacuum tank may be attached to the riser for the purpose of removing the liquid from the main or drip. In the intermediate gas pressure distribution systems, it is usual to have a shut-off valve placed at the upper end of riser with a short nipple extending to or near ground level and adapted to be sealed by a closure means. Frequently in the high-pressure distribution systems there is an additional valve placed immediately above the gas mains. In cases where there is only one valve in a riser, a short drip, or roadway box is necessary in order to shield the valve from dirt, which box must be of sufficient cross-sectional area to provide adequate room for manipulating the valve. In cases where there are two valves in the riser it is necessary that the roadway box extend from the elevation of ground to the second valve adjacent to the main in order to provide a means for reaching this valve.

The present invention briefly consists of a novel construction and arrangements of parts particularly useful with the intermediate or higher pressure distribution systems whereby each riser is provided with a valve assembly of simple rugged and inexpensive construction which may either be entirely incased within the riser pipe or form a part of the upper section of riser so that it may be covered by the riser pipe closure or be placed in sealed engagement between sections of riser, and which has no exposed cracks or openings through which dirt or grit may work into the valve.

In its preferred forms such assembly consists basically of a stationary valve member fixed to the riser at the top or bottom thereof or between sections of the riser and having a threaded central hole or bore into which a valve closure plug is screwed, the construction being such that the valve plug is normally set in its closed or shut-off position when the riser closure is in place. Hence, when liquid is to be drained from the gas main and the closure at the top of the riser is removed to enable a conduit connection from a medium for the removal and transfer of the liquid to be connected in sealed engagement with said riser, there will be no escape of gas. The present invention also includes actuating means associated with such connection for engaging the valve plug and causing it to be moved to opened position either as the pipe connection is being attached to the riser or after its connection thereto has been completed.

As hereinafter disclosed more fully, the movable valve plug or the stationary valve member into which it is screwed is provided with one or more passageways through which communication is established when the valve plug is in opened position and which communication is shut off when the valve plug is in closed position; the construction preferably being such that until the conduit connection has been attached to the riser the valve is closed. The movable valve plug is provided with rotation means and the conduit connection preferably has associated with it means for cooperative engagement with said rotation means so that the act of screwing the connection on to the top of the riser or valve plug opens the valve, and the unscrewing of the conduit connection automatically causes the valve to close.

A modification of this conduit connection provides a manually actuated member in said connection for rotation independently thereof and having connection means engageable with said valve closure plug to rotate and move the same from closed to opened positions and from opened to closed positions. As the valve of the present invention may be placed at any position with reference to the top or bottom of the riser, the valve rotation means associated with the conduit connection leading to the medium for removal of liquid is preferably adjustable in length to engage the movable valve plug and to compensate for variations in the locations of the valves between the top and bottom of the riser.

As it may in some instances be desirable to provide an additional shut-off means at the lower end of the riser adjacent to the gas main, as well as a shut-off valve at the upper end, the invention includes the provision for such a second valve, together with a connection between the valve plug of the upper valve assembly and valve plug of the lower one so that the lower valve plug will be moved to opened and closed positions simultaneously and in synchronism with the opening and closing of the upper valve. With the valve assembly of this invention, a roadway box is not necessarily required, except in those places where the top of the riser terminates in a paved sidewalk or road, in which case a short box may be used as a convenience to provide clearance space for facilitating the removal of the closure means at the top of the riser.

From the foregoing, it will be seen that the principal object of the present invention is to provide a new and improved construction for a valve assembly capable of being so connected with a standard riser having its upper end terminating adjacent to the ground level, and which valve assembly will normally be effectively covered by a closure means such as an ordinary standard pipe closure cap, the removal of which permits access to be had to the movable closure member of the valve only when said closure is removed.

Another object is to provide a practically foolproof type of construction that will effectively prevent any appreciable escape of gas during the act of connecting a pump to the riser to withdraw collected liquid from a low point of a gas main.

A further object is to provide such a fool-proof and effective shut-off means of simple and inexpensive construction that will obviate the necessity for the use of more expensive types of shut-off valves heretofore employed at the upper ends of such risers, together with the relatively large and costly cast iron boxes to encase the same.

The above and other objects of the present invention will appear more fully from the following more detailed description and by reference to the accompanying drawings forming a part hereof, wherein Fig. 1 is a side elevation indicating a gas main section at a lower level wherein liquid is likely to collect and shown as equipped with a riser constructed in accordance with the principles of the present invention and having the upper end of the riser pipe closed by the usual pipe closure cap;

Fig. 2 is a view of the upper end of the structure shown in Fig. 1, but with the closure cap removed, and a pipe connection leading to a pump or other source of vacuum coupled thereto;

Fig. 3 is an enlarged vertical cross section of that part of Fig. 2 indicated by the line 3—3 thereon but with the section taken on the line 3—3 of Fig. 6 and showing the valve about to open;

Fig. 4 is a view similar to Fig. 3, showing the valve in open position;

Fig. 5 is a vertical section similar to Fig. 3 taken on the line 5—5 of Fig. 1 and showing the valve at the lower end of the riser;

Fig. 6 is a view similar to Fig. 3, showing a slightly modified form of construction;

Fig. 7 is a section on the line 7—7 of Fig. 6;

Figs. 8, 9, 10, 11 and 12 are horizontal sections on the lines 8—8, 9—9, 10—10, 11—11 and 12—12, respectively, of Fig. 3;

Fig. 13 is a view similar to Fig. 3, showing a modified form of valve;

Fig. 14 is a horizontal section on the line 14—14 of Fig. 13;

Fig. 15 is a further modified form of construction;

Fig. 16 is a horizontal section on the line 16—16 of Fig. 15; and

Fig. 17 is a further modified form of construction.

As shown in Fig. 1 of the drawings, the numeral 20 indicates a drip pot or lower section of a gas main in which liquid has collected. Fixedly secured thereto, as by a welded joint 21, is a short section of riser pipe 22. The lower end of pipe 22 extends to the bottom of the drip 20 and is cut away, as indicated at 22a, so that the collected liquid will have ready access to the pipe 22. Where the riser is a sectional one the pipe 22 at its upper end has secured to it a pipe coupling, preferably a standard pipe union 23, which serves to detachably secure the lower end of a longer riser pipe section 24 to the lower pipe section 22. A similar pipe union 25 is secured to the upper end of the pipe 24.

The union 25 serves as a connection for an upper pipe section 26, the top of which terminates a short distance below the surface of the ground and is normally closed by a closure means such as pipe closure cap 27, all as shown in Fig. 1 of the drawings; the union 25 when tightened serving to hold the pipe section 26 against rotation.

As shown in Fig. 3, the upper end of pipe section 26 has fixedly secured therein a stationary valve plug receiving member 28 press fitted in, or brazed or soldered, or otherwise nonrotatably secured to the pipe 26 so that the plug 28 is in gas-tight engagement with pipe 26.

In the particular constructional example shown in Fig. 3, the stationary plug 28 is provided with a threaded central bore 29 in which is adapted to be received a screw threaded valve plug 30. The stationary plug 28 is provided with a plurality of longitudinally extending radial slots 31, four of said slots preferably being provided at equally spaced intervals about said plug (Fig. 12); said slots being open at the bottom thereof to the interior of the pipe 26, as shown in Fig. 3. The valve plug 30 at its upper end is provided with noncircular socket 32, preferably hexagonal in cross-section, in which is adapted to be received the lower end of a similarly shaped rod 33 and by means of which the plug 30 may be rotated to cause it to be moved, because of its screw-threaded engagement, longitudinally of the fixed plug 28. A pipe coupling 34 screwed upon the lower end of a short connecting nipple pipe section 35 is adapted to be attached to the upper screw threaded end of pipe 26 after the closure cap 27 has been removed therefrom. Fixedly secured within said nipple section 35 is a plug 36 having a smooth central bore in which a rod 37 is slidably mounted.

At its lower end the rod 37 is provided with an enlarged portion 37a socketed to receive the upper end of the hex-rod 33, a pin 38 serving to secure rods 33 and 37 together against relative movement. Between the shoulder formed by the enlarged lower end 37a of rod 37 and the lower end of plug 36 is confined an extension spring 40 to normally urge rod 37 and the lower end of hex-rod 33 outwardly beyond the lower end of coupling 34. The plug 36 is provided with a plurality of longitudinally extending passageways 39, as clearly shown in Figs. 8 and 9 of the drawings. Fixedly secured within plug 36 and projecting upwardly therefrom within the pipe nipple 35 is a driver 42. This driver 42 is adapted, when the pipe 35 is rotated, to engage a radially extending driving pin 43 secured within the upper end of rod 37, the radial pin 43 also serving as a stop for engaging the top of plug 40 to limit outward movement of the rod 37 by spring 41.

The operation of the parts just described is as follows:

The pipe section 35 with coupling 34 serves as a pipe connection by means of which the upper end of the riser, consisting of the sections 22, 24 and 26, may be connected with a pump or other suitable means for removal of liquid; it being understood that coupling 34 will first be secured upon the lower end of the nipple 35 and screwed tightly thereon to be in effect bottomed. When the valve assembly is initially installed, the valve closure plug 30 will be so adjusted longitudinally of the fixed plug 28 as to be in a position such as indicated in Fig. 3 of the drawings in which a sufficient portion of the upper end of plug 30 is within the screw-threaded bore 29 of plug 28 so as to completely close the same and shut off communication between the longitudinally extending passageways 31 and bore 29. When it is desired to connect the nipple 35, with the coupling 34 secured to the lower end thereof to the upper threaded end of the riser pipe section 26, the nipple 35 with the rods 33, 37 and associated parts, is placed in position to engage the threads in the lower half of coupling 34 with the threaded upper end of pipe section 26, it being understood that the closure cap 27 has first been removed from pipe 26. The hexagonal rod 33, which is normally urged by the spring 40 so that its lower end projects outwardly some distance beyond the end of coupling 34 has its lower end forced against the top of the valve plug 30, and the nipple 35 is rotated until rod 33 is caused to enter, by the action of spring 40, into the socket 32 of plug 30. The nipple 35 with coupling 34 is then moved downwardly against the action of spring 40 until the threads of coupling 34 are in position to start engaging the threads on the upper end of pipe section 26. The provision of the spring 40 and the fact that the rod 37 is longitudinally slidable within the plug 36 enables the assembly of rods 33 and 37 to yield upwardly without causing any binding action until the threads of the coupling have started to engage properly with the threads on pipe section 26. After the engagement of the screw threads of coupling 34 and pipe section 26 has been properly started, the nipple 35 and coupling 34 are rotated to screw the coupling 34 home into gas-tight engagement on the pipe section 26. As the nipple 35 is so rotated, radial driving pin 43 will be engaged by the longitudinally extending pin 42; and as rotation of nipple 35 is continued the rod 33, which has been previously engaged within the socket 32 of plug 30, will cause plug 30 to be screwed downwardly through plug 28 from a position such as indicated in Fig. 3 until, by the time the coupling 34 has been screwed tightly on pipe section 26, the upper end of plug 30 will have passed below the upper end of the longitudinal passageways or slots 31 to a position such as indicated in Fig. 4 of the drawing, in which position of the parts, as will be seen from Fig. 4, communication is established for the passage of the water of condensation or other liquid through the longitudinal passageways 31, the central aperture 29 of plug 28 and out through nipple 35, passing through the longitudinal slots 39 of plug 36 to the laterally extending outward pipe section 45 which is adapted to be connected by a union coupling 45a with the pump P or other suitable means for removal of liquid. The use of a pump to withdraw the collected liquid is not, however, always necessary, as the pressure in the main is sometimes sufficient to blow the liquid out through the riser.

As will be seen from the foregoing, because of the provision of the spring 40, together with the amount of rotational lost motion between the driving rod 42 and the radially extending driving pin 43, engagement of the lower end of the hexagonal rod 33 with the recess 32 of the plug 30 can be readily accomplished without hampering proper engagement of the screw threads of coupling 34 with the screw threads on the upper end of pipe section 26.

Because of the fact that it is essential that pipe section 26 will be held against rotation during the engagement of coupling 34 with it, the pipe section 26 is connected to the main riser pipe section 24 by means of the union 25, which, when it is tightened, will hold pipe section 26 securely against rotation.

As it will be desirable in most instances, in order to facilitate connecting the nipple 35 with the source of vacuum, an additional shut-off valve V is interposed between pipes 35 and 45 in the line 45 leading to the pump P, this valve being kept closed until after the nipple 35 has been connected and the coupling 45a made to the pump P. It will ordinarily be desirable to employ a valve such as indicated at V in pipe connection 35, 45, the latter preferably including a hose section and a union coupling 45a. As the pipe connection and pump would, of course, be used to service many risers, only a few of these would be needed for service crews.

It is sometimes advantageous, if, for example, the main riser sections should become corroded or damaged and need to be replaced, to provide a second shut-off valve at the lower end of the riser. The principles of the present invention may readily be adapted to the provision of such an additional valve structure, as shown in Fig. 5, wherein the upper end of the pipe section 22 has secured therein plug 48 similar to plug 28, having a screw-threaded central bore 49 in which is adapted to be received a valve plug 50, plug 48 being provided with the longitudinally extending passageways or slots 51. The plug 50 is provided with a hex-shaped socket 52 in which is received the lower end of a hex-shaped rod 53, the upper end of which is received within a similar socket provided in the lower face of plug 30. It will be understood that the rod 53 will be cut to such length that its upper and lower ends will be engaged respectively within the socket in the lower end of plug 30 and the socket 53 in plug 50 when the parts are originally assembled, and so that plug 50 will occupy substantially the same position relative to the plug 48 as plug 50 occupies with respect to plug 28; hence, as the coupling 34 and nipple 35 are screwed downwardly on to the upper end of pipe section 26 and valve plug 30 is caused to be moved to its opened position, as indicated in Fig. 4, a similar movement of valve plug 50 will be effected. When plug 50 is moved to open position, communication will be established through longitudinal passageways 51 and threaded aperture 49 of plug 48 in the same manner that communication is established through the upper plug 28.

In Figs. 6 and 7 I have shown a slightly modified form of construction in which, instead of using a standard pipe nipple 35 and coupling 34, a pipe section 35a, having a female threaded portion 34a on its lower end, has formed integrally with it a plug portion 36a having a central bore in which is slidably received a rod 37 with enlarged end 37a, connecting pin 38 and spring 40, like those shown in Figs. 3 and 4. Instead of having the driving means for rotating rod 37 formed as a separate piece of drill rod as shown at 42 in Figs. 3 and 4, in the form shown in Figs. 6 and 7, the driver 42a is formed integral with the pipe nipple 35 and plug portion 36a and the rod 37 is provided with a radial driving pin 43a suitably secured in rod 37. At its upper end the pipe section 35a is provided with pipe threads for connection to a shut-off valve V and conduit 45 such as shown in Fig. 2.

As the valve assemblies of this invention may, as heretofore pointed out, be located at any intermediate point between the top and bottom of the riser, it will be desirable to provide means for connecting an additional length of rod 33a to the bottom of rod 33, such means may take the form of a coupling sleeve 33b secured by any suitable means, such as the pins 33c, to the lower end of rod 33, and the upper end of rod 33a.

In Figs. 13 and 14 I have shown a modified type of valve plug 30a. In this modification the longitudinal passageways 60 are provided in the movable valve member 30a instead of being provided in the fixed valve member such as the plugs 28 and 48.

In the form shown in Fig. 13 the fixed valve member is in the form of a plug-like nipple 61 which may be screwed into the upper end of the riser pipe section 26 or, where a sectional riser is used, at an intermediate or lower position between the riser sections, the plug nipple in either case serving as a pipe connecting means. As obviously it makes no difference whether the longitudinal passages are provided in the fixed or movable member of the valve assembly in Fig. 13, I have shown them in the movable valve plug 30a. When, however, this form is used the valve is opened by moving plug 30a upward; hence, it and the bore of nipple 61 are provided with left-hand threads instead of the customary right-hand threads, coupling 34 being the standard coupling with right-hand threads. As it may be desirable to provide additional valve seating surfaces, I have shown valve plug 30a in Fig. 13 as provided with an annular flange 62 having an annular valve seating surface 63 adapted to engage a suitable annular gasket 64 preferably imbedded in a suitable annular recess formed in the upper face of the nipple plug 61. The lower end of valve plug 30a is provided with a suitable recess for engagement with the upper end of the hex rod 53.

It will, of course, be understood that nipple 35 and associated parts shown in Fig. 13 are identical with those shown in Figs. 1 to 4 inclusive. The operation of the modification of Fig. 13, as will therefore be readily understood, is quite similar to that shown and described in connection with Figs. 1 to 4 inclusive, except that, as the threads on the valve plug are left hand when nipple 35 is screwed down, plug 30a is screwed upwardly until it has moved to a position such as shown in Fig. 13 in which communication between pipe section 26 and nipple 35 will be established through the longitudinal passageways 60 in valve plug 30a.

When nipple 35 and coupling 34 are rotated to disengage the coupling from the upper end of nipple plug 61, the valve plug 30a will then be moved downwardly until the annular valve closure seat on the lower face of flange 62 will be forced into tight sealing engagement with the gasket 64.

In the modification shown in Figs. 15 and 16, a nipple plug 61, like that shown in Figs. 13 and 14, is provided in the upper end of pipe section 26 and a closure cap 27 is provided for engagement with the upper threaded half of the nipple plug 61. After closure cap 27 has been removed, a nipple 35 and coupling 34, similar to those shown in Figs. 1, 2, 3, 4 and 13, may then be engaged with the threads of the nipple plug 61 and the lower end of a rod 33 having associated parts such as shown in Fig. 3 is engaged in the socketed end 72 of the valve closure plug 70.

Valve closure plug 70 like plug 30a is provided with left-hand threads but, instead of providing it with a plurality of longitudinal passageways, the means for establishing the communication between the upper and lower ends of the riser in this instance is in the form of a central longitudinal passageway 71 in plug 70 which communicates at its upper and lower ends with a plurality of diametrally extending passageways 72.

As will be obvious from an inspection of Fig. 15, communication is established from pipe section 26 to nipple 35 when valve plug 70 has been screwed upwardly by rotation of the nipple 35 to a position such that the upper diametral passageways 72 are above the top of nipple plug 61, the length of central passageway 70 and the longitudinal spacing of the two sets of diametral passageways being greater than the length of plug 61 so that when upper passageways 72 are above the top of nipple plug 61 the lower passages 72 will lie below the lower face of nipple plug 61, thereby to establish communication between the nipple 35 and pipe section 26.

In Fig. 17 I have shown the uppermost riser pipe section 26 as having a pipe coupling 65 attached to its upper end. Screwed into coupling 65 is a plug nipple 66 which like the nipple 61 shown in Fig. 15 is adapted to have a closure cap 27 screwed on to it to close the upper end of the riser. Nipple plug 66 has a central screw-threaded bore 69 in which is adapted to be received a valve plug 75, plug 75 being provided with a plurality of longitudinally extending passageways 76. The lower end of valve plug 75 is provided with a hex-shaped socket adapted to receive the upper end of connecting hex rod 53, leading to the lower valve such as shown in Fig. 5. At its upper end valve plug 75 is provided with a similar hex-shaped socket 77 to receive the lower end of a hex-shaped actuating rod 78. The upper end of rod 78 is received within similarly shaped recess in the bottom of a screw 79 preferably secured, as by a pin 80, to the hex rod 78. Screw 79 is screw threaded in the upper boss 81 of an L-fitting 82 adapted for connection by means of pipe or hose 45 to a pump P, such as shown in Fig. 2. Projecting diametrically through the upper end of screw 79 is an actuating rod 83 by means of which the valve plug may be manually moved to and from its opened and closed positions.

In the modification shown in Fig. 17 the operation, as will be readily understood, is quite similar to that described in connection with the other figures, except that in Fig. 17 the valve plug 75 is not opened and closed by the mere act of attaching the pipe coupling parts which lead to the pump to the pipe section 26. Normally, with the structure shown in Fig. 17, the valve plug 75 will have been screwed down into the nipple plug 66 to a point such that the unslotted upper closure portion of the valve plug will be lodged within the screw-threaded bore 69 so as to cut off communication through the longitudinal passageway 76 thereof. A closure cap such as shown in Fig. 15 will also normally be screwed upon the upper end of nipple plug 66.

Assuming that it is desired to drain off collected liquid, the closure cap is removed but, as the valve plug 75 is in its closed position, no gas fumes can escape into the atmosphere. Screw 79 first being screwed down until the lower end of hex rod 78 projects below the end of fitting 82, the lower end of hex rod 78 is entered into socket 77 of valve plug 75. L-fitting 82 is then caused to be engaged with the threads of nipple plug 66 by screwing the fitting downwardly upon screw 79, holding the screw 79 stationary with one hand while rotating the fitting with the other hand. After the L-fitting 82 has been tightly screwed upon the nipple plug, the screw 79 is then rotated by the handle 83 to raise the valve plug 75 to its opened position, as shown in Fig. 17; it being understood that before the valve plug is moved to open position the coupling 45a will have been made to the pump.

While I have described the invention as applied to a gas main, the invention obviously is not limited to use with a gas main riser but it may be employed with any kind of a container to or from which it would be necessary or desirable to transfer gas and/or liquid.

It will further be understood that, if desired, the closure portion of any of the valve plugs shown may be provided with a slight taper or additional tapered cooperating sealing surfaces may be provided on the movable and fixed valve members to insure a more effective sealing. It is believed to be preferable to use standard machine screw threads for the valve plugs. When such threads are used, a liberal coating of graphite, common soap, or other lubricating material capable of forming a sealing joint should preferably be applied to the valve plug or the threaded bore of the fixed plug before the valve plug is inserted into the fixed plug.

As will be seen from the foregoing, I have disclosed several modified forms of the invention, all of which have in common the use of a screw threaded valve plug that is adapted to be moved from an upper to a lower position, in one of which positions communication will be established through longitudinal passageways for withdrawal of collected liquid and that in each of the valve modifications shown, after the upper end of the riser has been connected with the pipe connections leading to a pump or other means for removal of liquid, the valve means may then be opened to permit the collected liquid to be withdrawn without permitting any escape of gas to the atmosphere. It will be understood that it may not always be necessary to use a pump or other source of vacuum to suck out the collected liquid, the pressure in the main sometimes being sufficient to eject such liquid.

Although I have shown the riser in Figs. 1 and 2 as consisting of a number of pipe sections and as provided with two valve assemblies, one in the upper terminal pipe section 26 and the other in the lower section 22, it will be obvious that, if desired, the riser may consist of but a single section of pipe; likewise, that but a single valve only, located adjacent the bottom of the riser, or at any intermediate point between the top and bottom thereof, may be employed with either the sectional or single pipe risers.

It will, of course, be obvious that, as the length of rod 33 associated with the pipe connections 35, 35a or 82 for engaging and rotating the movable valve plug would have to be varied depending upon the distance below the top of the riser at which the valve assembly is rotated, the simple sleeve and pin coupling shown in Fig. 6 may be provided for attaching an additional length of rod to the lower end of the rod 33 or rod 78; it being understood that where the valve assemblies are located at lower levels, their locations would be standardized so that the service crews would need to carry but a limited number of additional rods 33a.

It will also be obvious that the conduit connection and valve plug rotating means shown in Fig. 17 and which is rotatable independently of the conduit connection may be used with any of the valve assembly constructions shown in Figs. 1 to 16; likewise, that the different forms of valve rotatable plugs shown may be used either with an inserted stationary valve plug member such as shown in Figs. 3, 4 and 5, or with a plug nipple as shown in Figs. 13 to 17 which may serve as a connection between the riser sections.

It is to be understood that the term "riser" as used in the claims hereunto appended is not to be construed as limited to a vertically extending pipe but is intended to apply to any tubular member, attachment or appurtenance in sealed engagement with, and projecting laterally in any direction from, a gas main or other receptacle. Likewise, that the invention obviously is equally applicable to the addition of, as well as the withdrawal of, gas and/or liquid from the container to which the riser is attached.

It will be further understood that many further variations, changes, and modifications, which will be readily apparent to those skilled in the art to which the present invention relates, may be resorted to without departing from the spirit or scope of the invention as defined in the claims hereunto appended.

I claim:

1. Fluid control apparatus comprising a member having a fluid passage therethrough adapted to communicate with the interior of a container, said member adapted to be secured to said container in sealing engagement therewith, a valve in said passage for controlling flow of fluid through the passage, a fitting releasably attached to said member, said valve having threaded engagement with said member interiorly thereof and said fitting being in threaded engagement with said member exteriorly thereof, a guide element fixed within said fitting, a valve operating element comprising an axially extending wrench rod slidably and rotatably carried by said guide element, means normally urging said rod axially toward said valve while the fitting is being attached to said member, and clutch means comprising a radially extending projection on said valve operating element and an abutment on said guide element spaced radially from said valve operating element, said abutment being rotatable relative to said projection to permit lost motion in said clutch, said clutch means being adapted to rotate said valve operating element and said valve when said fitting is rotated for threaded attachment of said fitting to said member.

2. Fluid control apparatus as claimed in claim 1 including a shoulder on said wrench rod and in which said urging means comprises a spring interposed between said shoulder and said guide element.

References Cited in the file of this patent

UNITED STATES PATENTS

| Number | Name | Date |
|---|---|---|
| 202,629 | Byrne | Apr. 23, 1878 |
| 286,954 | Murphy | Oct. 16, 1883 |
| 307,516 | Anson | Nov. 4, 1884 |
| 408,831 | Emerson | Aug. 13, 1889 |
| 536,378 | Frey | Mar. 26, 1895 |
| 575,545 | Dunn | Jan. 19, 1897 |
| 773,968 | Nadorf | Nov. 1, 1904 |
| 1,192,980 | Dode | Aug. 1, 1916 |
| 1,378,492 | Stanley | May 17, 1921 |
| 1,565,913 | Dosker | Dec. 15, 1925 |
| 1,707,630 | Erceg | Apr. 2, 1929 |
| 1,982,066 | Oxley et al. | Nov. 27, 1934 |
| 2,024,349 | Field | Dec. 17, 1935 |
| 2,061,814 | Stout | Nov. 24, 1936 |
| 2,073,311 | May | Mar. 9, 1937 |
| 2,081,132 | Barnes | May 25, 1937 |
| 2,186,925 | Hooper | Jan. 9, 1940 |
| 2,241,857 | Hisaw | May 13, 1941 |
| 2,341,517 | Wieland | Feb. 15, 1944 |
| 2,414,911 | Temple | Jan. 28, 1947 |
| 2,509,426 | Fransen | May 30, 1950 |

FOREIGN PATENTS

| Number | Country | Date |
|---|---|---|
| 112,237 | Great Britain | of 1918 |
| 273,161 | Italy | of 1930 |
| 350,080 | Italy | of 1937 |
| 564,926 | Great Britain | Oct. 19, 1944 |